United States Patent
Hamdan

(10) Patent No.: US 12,067,853 B1
(45) Date of Patent: Aug. 20, 2024

(54) ATTIC SECURITY SYSTEM

(71) Applicant: Nadim Hamdan, Boynton Beach, FL (US)

(72) Inventor: Nadim Hamdan, Boynton Beach, FL (US)

( * ) Notice: Subject to any disclaimer, the term of this patent is extended or adjusted under 35 U.S.C. 154(b) by 71 days.

(21) Appl. No.: 18/110,476

(22) Filed: Feb. 16, 2023

(51) Int. Cl.
| | |
|---|---|
| *G06V 40/10* | (2022.01) |
| *G06V 40/20* | (2022.01) |
| *G08B 13/196* | (2006.01) |

(52) U.S. Cl.
CPC ....... *G08B 13/19695* (2013.01); *G06V 40/10* (2022.01); *G06V 40/20* (2022.01); *G08B 13/19606* (2013.01); *G08B 13/19656* (2013.01)

(58) Field of Classification Search
CPC ........ G06V 40/10; G06V 40/20; G06V 40/23; G08B 13/19606
See application file for complete search history.

(56) References Cited

U.S. PATENT DOCUMENTS

| | | | |
|---|---|---|---|
| 7,893,960 B1 | 2/2011 | Wallach | |
| 9,300,921 B2 | 3/2016 | Naidoo et al. | |
| 2014/0226855 A1* | 8/2014 | Savvides | H04W 4/021 382/103 |
| 2019/0096220 A1* | 3/2019 | Anderholm | G08B 21/0476 |

* cited by examiner

*Primary Examiner* — Benyam Haile
(74) *Attorney, Agent, or Firm* — Sanchelima & Associates, P.A.; Christian Sanchelima; Jesus Sanchelima

(57) ABSTRACT

An attic security system including a housing assembly, a camera assembly and an electronic assembly. The housing assembly includes a housing. The electronic assembly is embedded within said housing. The camera assembly includes at least one camera. The at least one camera is attached to a top end of the housing. The electronic assembly includes sensors and a microprocessor. The microprocessor can identify patterns of shapes and movement patterns through the sensors and the at least one camera. The microprocessor can recognize if the movement patterns and the patterns of shape correspond to movement patterns and patterns of shape of wildlife and send images or videos taken by the at least one camera to a remote device via email or text.

12 Claims, 3 Drawing Sheets

ATTIC SECURITY SYSTEM

BACKGROUND OF THE INVENTION

1. Field of the Invention

The present invention relates to an attic security system and, more particularly, to an attic security system that detects wildlife in the user's attic by means of a set of 360 degrees cameras and alerts the user with a text message or email.

2. Description of the Related Art

Several designs for security systems have been designed in the past. None of them, however, include a motion sensor to detect movement and take pictures or video with a set of cameras, where the motion sensor and the camera are built in a single device.

Applicant believes that a related reference corresponds to U.S. Pat. No. 9,300,921 issued for a video security system that may transmit an alarm video corresponding to the alarm condition automatically to a customer at an email address by any other electronic means. Applicant believes that another related reference corresponds to U.S. Pat. No. 7,893,960 issued for a smart system for protecting property comprising human or animal detectors connected to cameras. None of these references, however, teach of a home security system for a residential attic space having a wirelessly connected panoramic video camera and a motion sensor, where upon detection of wildlife in the attic, the system will photograph or video the animal and send and image or video of the animal to a remote device via email or text.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an attic security system that includes a microprocessor connected to a set of video cameras, where the microprocessor is adapted to identify wildlife through the video cameras It is another object of this invention to provide an attic security system that includes a set of videocameras, where the cameras have a 360 degrees range view.

It is still another object of the present invention to provide an attic security system that includes a transmitter capable of send a text message or an email with pictures taken by the set of video cameras, where the video cameras are actuated to take the picture when a sensor embedded therein detects movement and wildlife is detected with the videocameras.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
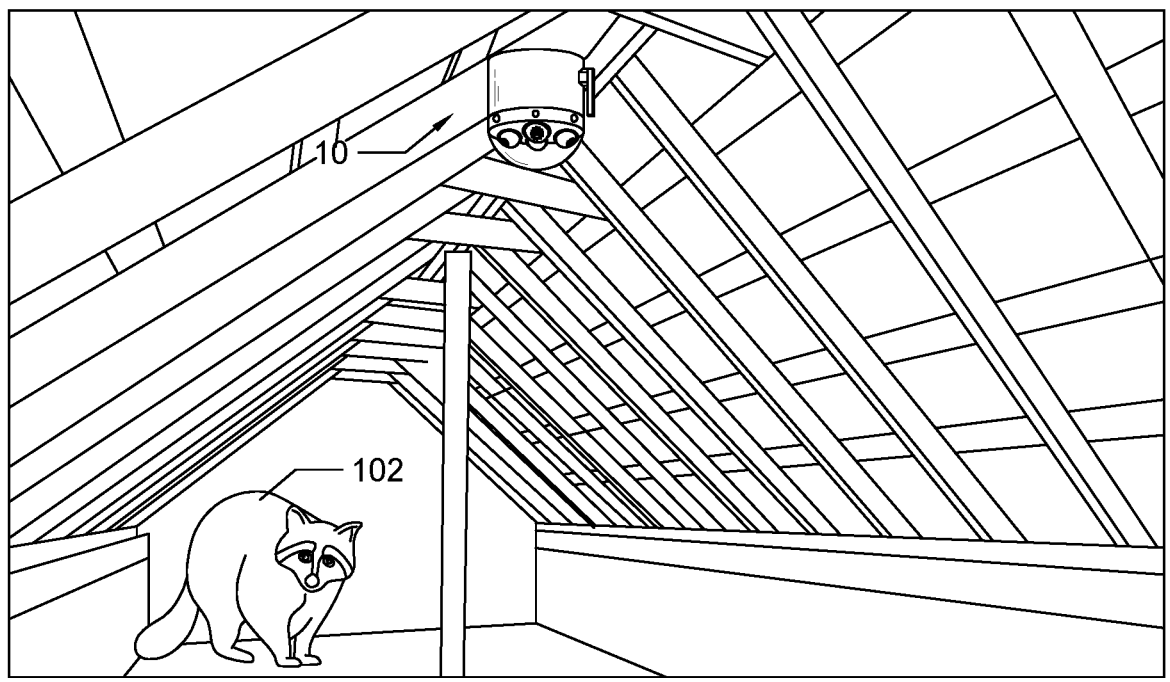
FIG. 1 represents an isometric operational view of the present invention 10 detecting wildlife 102.
Figure 2:
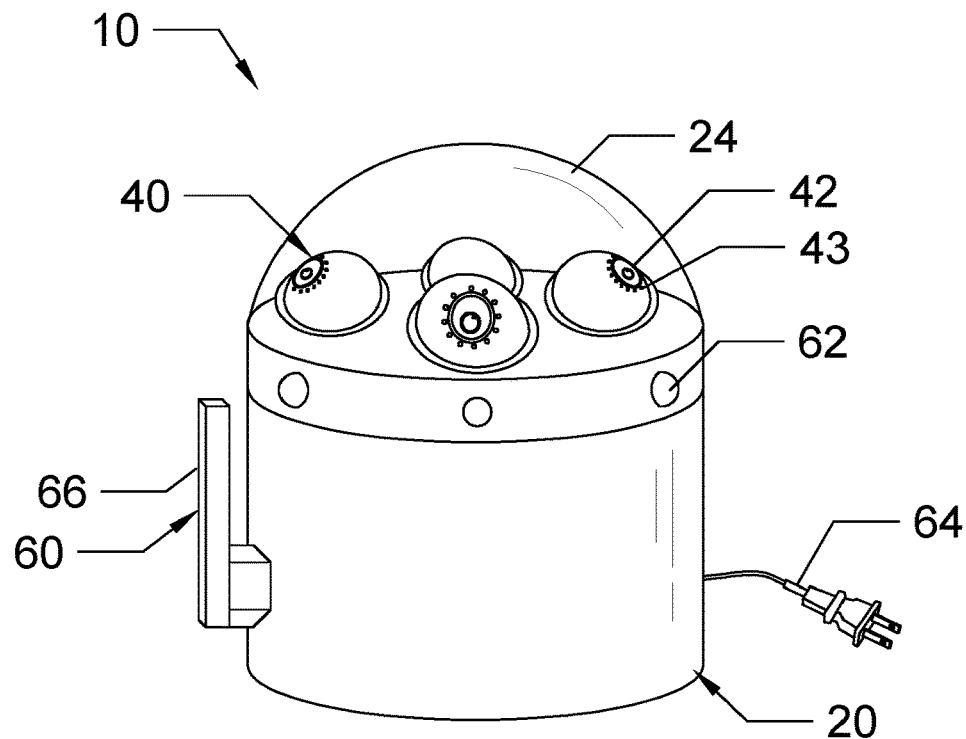
FIG. 2 shows an isometric view of the present invention 10. The present invention 10 includes a housing assembly 20, a camera assembly 40 and an electronic assembly 60.

Referring now to the drawings, where the present invention is generally referred to with numeral 10, it can be observed that it basically includes a housing assembly 20, a camera assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 may include a housing 22 and a protective dome 24. The housing 22 may substantially have a cylindrical shape. It also may be suitable for the housing 22 to have a rectangular shape, an hemispherical shape, or any other suitable shape. The housing 22 may be made of polyvinyl chloride or stainless steel. It also may be suitable for the housing 22 to be made of polyethylene, aluminum, or any other suitable material. The housing 22 may have elements of the electronic assembly 60 therein. The housing 22 may have a planar bottom end. It should be understood that the planar bottom ends 22 may have attaching means such as adhesives, screws, or any other attaching means to fix the present invention to a predetermined surface. In a preferred embodiment the predetermined surface is an attic's ceiling.

The protective dome 24 may be attached to a top end of the housing 22. The protective dome 24 may have an hemispherical shape. The protective dome 24 may be made of a rigid transparent plastic. The protective dome 24 may be made of polyethylene terephthalate, polyvinyl chloride, polypropylene, or any other suitable material. The protective dome 24 may be used to protect the camera assembly 40.

The camera assembly 40 may include at least one camera 42. In a preferred embodiment the at least one camera 42 may be an omnidirectional video camera. The at least one camera 42 may be attached to the top end of the housing 22 and enclosed by the protective dome 24. The at least one camera 42 may be capable of recording video and taking pictures. In a preferred embodiment the at least one camera 42 include a plurality of cameras working together to provide a detailed view with a field of view near to the 360 degrees.

The at least one camera 42 may include lights 44. In a preferred embodiment lights 44 are light emitting diodes. The lights 44 may be used to provide or aid the at least one camera 42 with night-vision. It also may be suitable for the lights 44 to emit infrared light so the at least one camera detect the infrared wavelengths to produce images. It also may be suitable for the at least one camera 42 to have infrared light integrated therein. The at least one camera 42 may work along with the electronic assembly 60 to detect wildlife 102.

Figure 3:
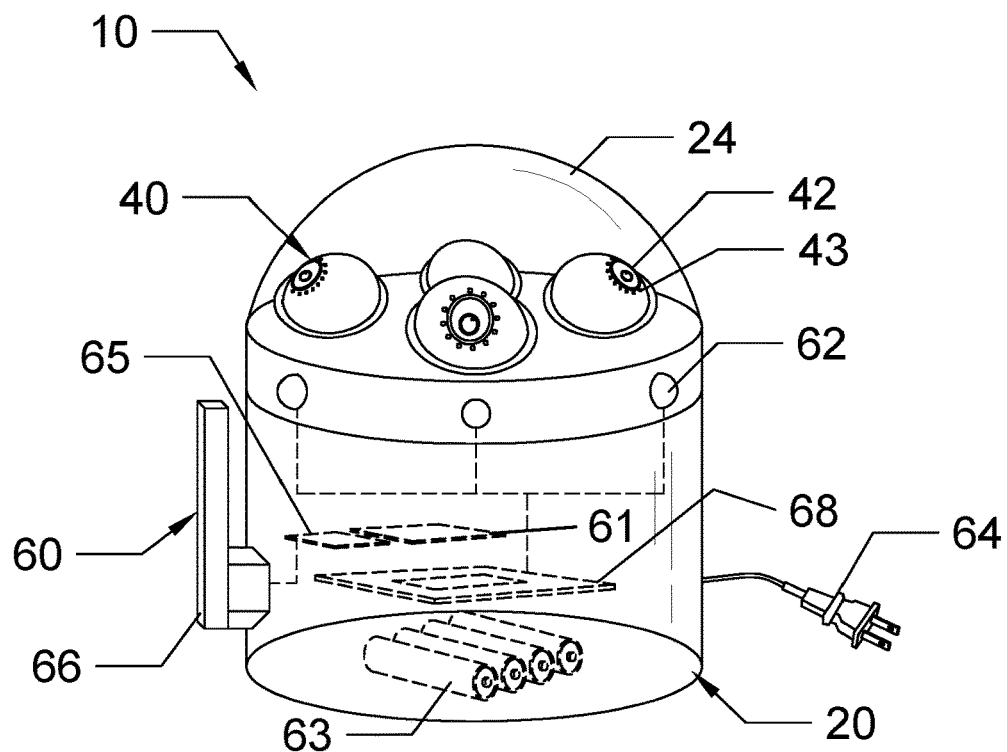
FIG. 3 illustrates a see-through view of the present invention 10 showing internal elements of the electronic assembly 60.

As best illustrated in FIG. 3 the electronic assembly 60 may include batteries 63, a microprocessor 68, storage 61, an emitter 65, an antenna 66, sensors 62 and a power cord 64. In a preferred embodiment, sensors 62 may be pyroelectric passive infrared sensors. It also may be suitable for the sensors 62 to be microwave sensors, dual tech sensors, or any other motion sensor known in the prior art. The sensors 62 may be adapted to detect movement of wildlife 102.

Figure 4:
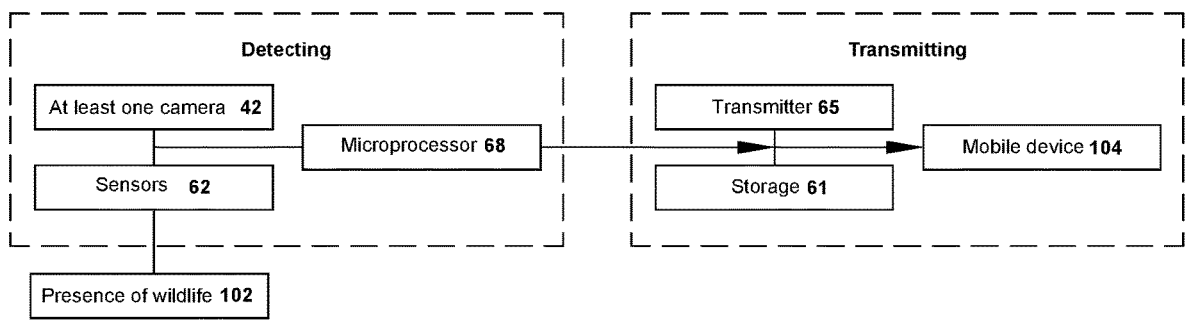
FIG. 4 is a representation of a schematic view of the present invention 10 showing relationship between components thereof.

As best illustrated in FIG. 4 the at least one camera 42 and the sensors 62 may be connected to microprocessor 68. In a preferred embodiment microprocessor 68 may be programmed with convolutional neural networks to identify wildlife 102. The microprocessor 68 may process images from the at least one camera 42 to identify patterns of shapes. The microprocessor 68 may further process data from the sensors 62 to identify movement patterns. It also may be suitable to use the sensors 62 to identify movement to actuate the at least one camera to start recording or taking pictures. It also may be suitable to use the at least one camera to identify movement patterns. The microprocessor is capable of using the detected patterns of shapes and the movement patterns obtained from the at least one camera 42 and the sensors 62 to identify if the movement patterns and the patterns of shapes correspond to wildlife 102.

If the movement patterns and the patterns of shapes correspond to wildlife 102 images or video taken by the at least one camera 42 may be sent to a mobile device 104. The images or video taken by the at least one camera 42 are also stored in storage 61. To transmit the images or video taken by the at least one camera 42, the microprocessor 68 may actuate the transmitter 65. The transmitter 65 may be actuated to send the images or video taken by the at least one camera to a receiver in a mobile device 104. In a preferred embodiment the transmitter 65 may use WiFi technology to transmit data. It also may be suitable for the transmitter 65 to use bluetooth technology, Zigbee technology, 5G wireless technology, or any other suitable technology for data transmission. The antenna 66 may be used to transmit a clear signal between the transmitter and the mobile device 104. The batteries 63 may provide power to the electronic assembly 60. The batteries 63 are rechargeable batteries. The batteries 63 may be a backup for the power cord 64. The power cord 64 may be connected to the power supply to provide power to the electronic assembly 60.

In a preferred embodiment the present invention 10 may be fixed to an attic's ceiling and the at least one camera 42 along with the sensors 61 and microprocessor 68 may be used to detect wildlife presence. When wildlife 102 is detected the present invention 10 may sent an alert such as a text message or an email to a mobile device 104 with images or videos recorded by the at least one camera 42 to mobile device 104 to show the presence of wildlife 102.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attic security system, comprising:
   a housing assembly, wherein said housing assembly includes a housing, wherein a bottom end of said housing is attached to an attic's ceiling;
   a camera assembly, wherein said camera assembly includes at least one camera, wherein said at least one camera is attached to a top end of said housing; and
   an electronic assembly, wherein said electronic assembly includes sensors and a microprocessor, wherein said microprocessor is configured to identify patterns of shapes by means of said at least one camera, wherein said microprocessor is configured to identify movement patterns by means of said sensors, wherein said microprocessor is configured to recognize if said movement patterns and said patterns of shape correspond to wildlife and send a images or video of said wildlife to a remote device via email or text, wherein said microprocessor is embedded within said housing.

2. The attic security system set forth in claim 1, wherein said electronic assembly includes a transmitter, wherein said transmitter is adapted to transmit said images or videos to said remote device, said transmitter uses WiFi technology.

3. The attic security system set forth in claim 1, wherein said electronic assembly includes batteries, said batteries are rechargeable batteries, said battery provides power to said microprocessor, said sensors and said at least one camera.

4. The attic security system set forth in claim 3, wherein said electronic assembly includes a power cord, said power cord is connected to the power supply to provide power to said microprocessor and said sensors, wherein said batteries are a backup power source.

5. The attic security system set forth in claim 1, wherein said microprocessor is programmed with convolutional neural networks to identify if said movement patterns and said patterns of shape correspond to movement patterns and patterns of shape of said wildlife.

6. The attic security system set forth in claim 1, wherein said housing assembly includes a dome, wherein said dome has an hemispherical shape, said dome is attached to the top end of said housing.

7. The attic security system set forth in claim 6, wherein said dome is hollow, said dome is transparent, wherein said at least one camera is enclosed within said dome.

8. The attic security system set forth in claim 1, wherein said at least one camera is an omnidirectional video camera.

9. The attic security system set forth in claim 1, wherein said at least one camera includes infrared lights for night vision.

10. The attic security system set forth in claim 1, wherein said sensors are pyroelectric infrared sensors, said sensors are embedded in a top portion of said housing.

11. An attic security system, comprising:
    a housing assembly, wherein said housing assembly includes a housing and a dome, wherein a bottom end of said housing is attached to an attic's ceiling, wherein said dome is attached to a top end of said housing, said dome has an hemispherical shape, said dome is hollow and transparent;
    a camera assembly, wherein said camera assembly includes at least one camera, wherein said at least one camera is attached to a top end of said housing, wherein said at least one camera is enclosed within said dome; and
    an electronic assembly, wherein said electronic assembly includes sensors, a transmitter and a microprocessor, wherein said sensors are pyroelectric infrared sensors, wherein said microprocessor is configured to identify patterns of shapes by means of said at least one camera, wherein said microprocessor is configured to identify movement patterns by means of said sensors, wherein said microprocessor is configured to recognize if said movement patterns and said patterns of shape correspond to movement patterns and patterns of shape of wildlife and send a images or video of said wildlife to a remote device via email or text, wherein said transmitter is adapted to transmit said images or videos to said remote device, said transmitter is operatively connected to said microprocessor, said transmitter uses WiFi technology, wherein said microprocessor and said transmitter are embedded within said housing.

12. An attic security system, consisting of:
a housing assembly, wherein said housing assembly includes a housing and a dome, wherein a bottom end of said housing is attached to an attic's ceiling, wherein said dome is attached to a top end of said housing, said dome has an hemispherical shape, said dome is hollow and transparent;
a camera assembly, wherein said camera assembly includes at least one camera, wherein said at least one camera is attached to a top end of said housing, wherein said at least one camera is enclosed within said dome, wherein said at least one camera is an omnidirectional video camera, wherein said at least one camera includes infrared lights for night vision; and
an electronic assembly, wherein said electronic assembly includes sensors, batteries, storage, a power cord, a transmitter and a microprocessor, wherein said sensors are pyroelectric infrared sensors, said sensors are embedded in a top portion of said housing, wherein said microprocessor is configured to identify patterns of shapes by means of said at least one camera, wherein said microprocessor is configured to identify movement patterns by means of said sensors, wherein said microprocessor is programmed with convolutional neural networks to recognize if said movement patterns and said patterns of shape correspond to movement patterns and patterns of shape of wildlife and send a images or video of said wildlife to a remote device via email or text, wherein said transmitter is adapted to transmit said images or videos to said remote device, said transmitter is operatively connected to said microprocessor, said transmitter uses WiFi technology, wherein said batteries provide power to said electronic assembly and said at least one camera, wherein said power cord is configured to be connected to a power supply to provide power to said electronic assembly and said at least one camera, wherein said batteries are a backup power source, wherein said batteries are rechargeable batteries, wherein said storage is adapted to store images or videos from said at least one camera, wherein said microprocessor, said batteries, said storage and said transmitter are embedded within said housing.

* * * * *